United States Patent
Liu

(10) Patent No.: US 9,336,568 B2
(45) Date of Patent: May 10, 2016

(54) UNMANNED AERIAL VEHICLE IMAGE PROCESSING SYSTEM AND METHOD

(75) Inventor: Cheng Chien Liu, Tainan (TW)

(73) Assignee: National Cheng Kung University, Tainan (TW)

(*) Notice: Subject to any disclaimer, the term of this patent is extended or adjusted under 35 U.S.C. 154(b) by 758 days.

(21) Appl. No.: 13/524,045

(22) Filed: Jun. 15, 2012

(65) Prior Publication Data
US 2012/0320203 A1     Dec. 20, 2012

Related U.S. Application Data

(60) Provisional application No. 61/498,012, filed on Jun. 17, 2011.

(51) Int. Cl.
| | | |
|---|---|---|
| H04N 7/18 | (2006.01) | |
| G06K 9/62 | (2006.01) | |
| G06K 9/52 | (2006.01) | |
| G06T 3/40 | (2006.01) | |
| G01C 11/04 | (2006.01) | |
| G01C 11/02 | (2006.01) | |

(52) U.S. Cl.
CPC .............. *G06T 3/4038* (2013.01); *G01C 11/04* (2013.01); *G01C 11/02* (2013.01); *H04N 7/18* (2013.01); *H04N 7/181* (2013.01)

(58) Field of Classification Search
USPC ........................................................ 348/144
See application file for complete search history.

(56) References Cited

U.S. PATENT DOCUMENTS

| | | | | |
|---|---|---|---|---|
| 2001/0038718 | A1* | 11/2001 | Kumar et al. ................. | 382/284 |
| 2004/0233461 | A1* | 11/2004 | Armstrong ........... | G01C 11/025 356/620 |
| 2008/0215204 | A1* | 9/2008 | Roy et al. ........................ | 701/28 |
| 2008/0262724 | A1* | 10/2008 | Bodin et al. .................. | 701/210 |
| 2009/0015674 | A1* | 1/2009 | Alley et al. ................... | 348/144 |
| 2010/0283853 | A1* | 11/2010 | Acree ........................... | 348/144 |
| 2011/0301925 | A1* | 12/2011 | McWilliams et al. ............. | 703/6 |
| 2012/0114229 | A1* | 5/2012 | Zhou ............................. | 382/164 |

\* cited by examiner

*Primary Examiner* — Jessica M Prince
*Assistant Examiner* — On S Mung
(74) *Attorney, Agent, or Firm* — Bacon & Thomas, PLLC

(57) ABSTRACT

An unmanned aerial vehicle image processing system includes a digital camera mounted on an unmanned aerial vehicle, an autopilot controller installed in the unmanned aerial vehicle and pre-loaded with a base image, and a computer device. The autopilot controller programs a flight path as a series of mission lags to cover a target polygon on the base image in a lawnmower pattern for controlling the unmanned aerial vehicle to perform a flight mission in which the autopilot controller records plural GPS/INS data and triggers the digital camera to take plural photos which are further calibrated to generate plural calibrated photos corresponding to the plural GPS/INS data, respectively. The computer device processes the plural calibrated photos to generate plural projected photos by using the corresponding plural GPS/INS data, respectively, and stitches the plural projected photos to a mosaic image by a photo-stitching process.

11 Claims, 5 Drawing Sheets

UNMANNED AERIAL VEHICLE IMAGE PROCESSING SYSTEM AND METHOD

CROSS REFERENCE TO RELATED APPLICATION

This application claims the benefit of filing date of U.S. Provisional Application Ser. No. 61/498,012, entitled "Multi-level georeferencing of photos acquired from a low-cost unmanned aerial vehicle" filed Jun. 17, 2011 under 35 USC §119(e)(1).

BACKGROUND OF THE INVENTION

1. Field of the Invention

The present invention relates to the technical field of image processing and, more particularly, to an unmanned aerial vehicle image processing system and method.

2. Description of Related Art

Unmanned Aerial Vehicle (UAV) is an aircraft that can be remotely controlled or can fly autonomously based on pre-programmed flight plans or more complex dynamic automation systems. Comparing to the general air-borne or space-borne platform, UAV provides an innovative approach of remote sensing that is much cheaper, safer and more flexible to be deployed in a small area, ranged from a few to tens of square kilometers. As technologies advanced fast and cost decreased dramatically in the past few years, low-cost UAVs with competitive performance are now available commercially. Since all photos/data acquired by these low-cost UAVs need to be geo-referenced for further applications, to develop a fast and reliable approach to geo-referencing these photos/data plays one of the key roles of blooming the civilian market of low-cost UAV.

Rigorous approaches of geo-referencing photos/data acquired from the general airborne or spaceborne platforms have been made possible by the advances in photogrammetry and position/attitude sensors. The standard geo-referenced products, as a result, can be provided from these platforms on a regular basis. For the case of low-cost UAV platform, however, there is a significant gap in recording the accurate position and attitude data during its flight mission. The existing position/attitude sensors available are not only too heavy but also too expensive to be loaded on a low-cost UAV. As a result, a lot of low-cost UAV platforms are limited to qualitative applications using non-geo-referenced photos.

Another important characteristic of UAV is that the camera/sensor is not mounted on a rigid platform with the same light of sight well-calibrated all the time. In order to keep its mobility and flexibility, the camera/sensor module is usually assembled in the field and would be disassembled after the flight mission. The entire fuselage of a UAV would not be as rigid as the one of airborne or spaceborne platforms as well. Therefore, a constant boresight matrix (orientation offset) between the camera frame and the attitude sensor body frame is not a valid assumption for the case of UAV. The exterior orientation parameters of each photo in a low-cost UAV mapping system should be estimated individually in order to obtain a precise boresight matrix for high-accuracy planimetric mapping.

Therefore, it is desirable to provide an improved unmanned aerial vehicle image processing system and method to mitigate and/or obviate the aforementioned problems.

SUMMARY OF THE INVENTION

The object of the present invention is to provide a unmanned aerial vehicle image processing system and method that can solve the aforementioned problems.

According to a feature of the invention, there is provided an unmanned aerial vehicle image processing system, which comprises: a digital camera mounted on an unmanned aerial vehicle; an autopilot controller installed in the unmanned aerial vehicle and pre-loaded with a fly file generated from a base image drawn thereon a target polygon, wherein the autopilot controller is configured to program a flight path as a series of mission lags to cover the target polygon on the base image in a lawnmower pattern for controlling the unmanned aerial vehicle to perform a flight mission by traveling along the flight path in which the autopilot controller records plural GPS/INS data and triggers the digital camera plural times to take plural photos which are further calibrated based on calibration parameters of the digital camera to generate plural calibrated photos corresponding to the plural GPS/INS data, respectively; and a computer device for receiving the plural calibrated photos and the plural GPS/INS data, processing the plural calibrated photos to generate plural projected photos by using the corresponding plural GPS/INS data, respectively, and stitching the plural projected photos to a mosaic image by a photo-stitching process.

According to another feature of the invention, there is provided an image processing method for use in an unmanned aerial vehicle image processing system including a digital camera mounted on an unmanned aerial vehicle, an autopilot controller installed in the unmanned aerial vehicle, and a computer device. The method comprising the steps of: (A) configuring the autopilot controller, which is pre-loaded with a fly file generated from a base image drawn thereon a target polygon, to program a flight path as a series of mission lags to cover the target polygon on the base image in a lawnmower pattern for controlling the unmanned aerial vehicle to perform a flight mission by traveling along the flight path in which the autopilot controller records plural GPS/INS data and triggers the digital camera plural times to take plural photos which are further calibrated based on calibration parameters of the digital camera to generate plural calibrated photos corresponding to the plural GPS/INS data, respectively; (B) downloading the plural calibrated photos and the plural GPS/INS data into the computer device for processing the plural calibrated photos to generate plural projected photos by using the corresponding plural GPS/INS data, respectively; and (C) stitching the plural projected photos to a mosaic image by a photo-stitching process.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
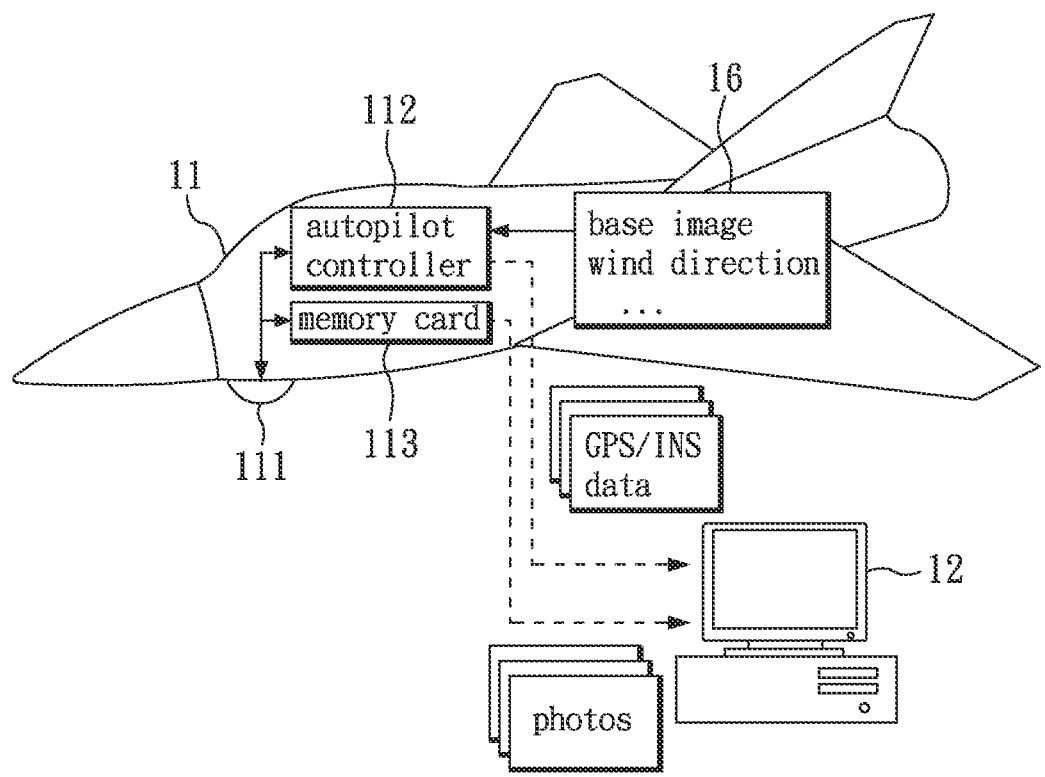
FIG. 1 schematically illustrates an unmanned aerial vehicle image processing system in accordance with an embodiment of the present invention.
Figure 1:

With reference to FIG. 1, there is shown an unmanned aerial vehicle image processing system in accordance with an embodiment of the present invention. The unmanned aerial vehicle image processing system includes: a digital camera 111 mounted on an unmanned aerial vehicle 11, an autopilot controller 112 installed in the unmanned aerial vehicle 11 and a computer device 12. The autopilot controller 112 can be configured to control the unmanned aerial vehicle 11 to perform at least one flight mission. The digital camera 111 is provided to take photos of a study area 15 in the flight mission. The computer device 12 is provided to process the photos taken in the flight mission for generating an image of a target area.

To program the flight mission for the unmanned aerial vehicle 11, the autopilot controller 112 is loaded with a fly file 16 generated from the wind direction, a base image of the study area 15 on which a target polygon 151 is drawn as the target area for taking photos. The camera 111 is preferably connected with a memory card 113 in which photos taken by the camera 111 are stored. The unmanned aerial vehicle 11 is preferably a fixed-wing glider, such as CropCam®, that is commercially available at comparatively lower cost.

Figure 2:
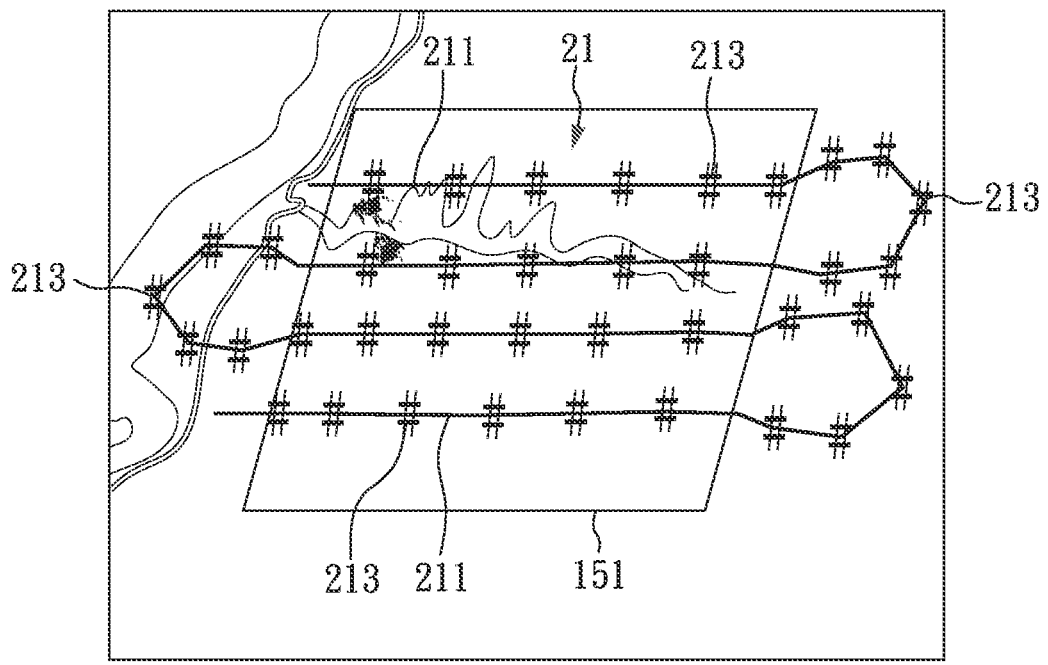
FIG. 2 schematically illustrates the programmed flight path.

As shown in FIG. 2, to effectively utilize the duration of the flight mission, the autopilot controller 112 is configured to program a flight path 21 as a series of mission lags 211 in a lawnmower pattern, by presetting a plurality of waypoints 213 for the flight path 21, to cover the target polygon 151 on the base image for controlling the unmanned aerial vehicle 11 to perform a flight mission by traveling along the flight path 21. Further, because the unmanned aerial vehicle 11 is usually a lightweight platform that is easily affected by cross winds, the autopilot controller 112 is configured to specify flight courses to be parallel with the wind direction to avoid cross winds, so as to ensure that the unmanned aerial vehicle 11 consistently flies along the programmed flight path 21 and each photo is taken as close as the preset waypoint 213.

All photos taken in the flight mission need to be mosaicked into one large planimetric image for further application. To ensure the success of mosaic, the digital camera 111 is controlled to take photos while maintaining certain fraction of overlapping. For the case of 50% overlapping, each desired point in the study area 15 would be covered by four different photos. Note that the higher fraction of overlapping increases the total number of photos rather than the total coverage.

The unmanned aerial vehicle 11 usually needs a certain amount of turning radius to make a u-turn, yet two adjacent lags 211 with 50% overlapping might be too close for the unmanned aerial vehicle 11 to make a full u-turn. Therefore, the autopilot controller 112 is configured to add more waypoints 213 to ensure that a full u-turn can be made before a new lag 211 is started. As illustrated in FIG. 2, after adding five extra waypoints 213 in the end of each lag 211, the actual trajectory of flight would be very close to the planned path and all lags 211 would be kept parallel with each other very well.

Therefore, with the unmanned aerial vehicle image processing system and method of the present invention, it only needs to draw the target polygon 151 on the base image of the study area 15 and specifies the wind direction, so as to make a detailed flight plan with the consideration of sufficient overlapping and turning radius, as well as automatically generate the corresponding fly file 16 that is ready for uploading to the unmanned aerial vehicle 11 to fly.

In the flight mission that the unmanned aerial vehicle 11 travels along the flight path 21, the autopilot controller 112 is operated to record plural GPS/INS data and trigger the digital camera 111 plural times to take plural photos corresponding to the plural GPS/INS data, respectively. Preferably, the autopilot controller 111 keeps a detailed log of GPS/INS data at the frequency of 4 Hz during the flight mission. The GPS/INS data includes the real-time readings of three GPS coordinates (x, y, z), three attitude (pitch, roll, yaw), three axes acceleration, three axes rotation, current speed, servo mode, as well as the planned coordinates, planned attitude and planned speed. Since the camera 111 is trigged by near-infrared signal controlled by a servo of the autopilot controller 112, it is able to identify each GPS/INS data corresponding to each photo by examining the servo mode. Once the flight mission is completed, the log of GPS/INS data, including the plural GPS/INS data, recorded in the entire mission can be downloaded to the computer device 12. The plural photos taken during this fight mission would have been stored in the memory card 113. These photos are copied to the computer device 12 for further processing as well.

The camera 111 is a non-expensive yet lightweight camera available in the market that can acquire more than 10 million pixels in single photo with great quality. To serve as a metric camera, the camera 111 needs to be calibrated, particularly the correction of lens distortion for each photo, by the calibration parameters of lens distortion. For example, a self-calibration approach is employed to calculate the amount of distortion for each pixel (x,y) of one photo taken based on the following equation:

$$\Delta x = -x_0 - \frac{\bar{x}}{c}\Delta c + \bar{x}r^2 K_1 + \bar{x}r^4 K_2 +$$
$$\bar{x}r^6 K_3 + (2\bar{x}^2 + r^2)P_1 + 2P_2\bar{x}\bar{y} + b_1 x + b_2 y,$$
$$\Delta y = -y_0 - \frac{\bar{y}}{c}\Delta c + \bar{y}r^2 K_1 + \bar{y}r^4 K_2 + \bar{y}r^6 K_3 + 2P_1\bar{x}\bar{y} + (2\bar{y}^2 + r^2)P_2,$$

where $\bar{x}=x-x_p$, $\bar{y}=y-y_p$, $r=\sqrt{\bar{x}^2+\bar{y}^2}$, c is the focal length, and the lens distortion parameters include principal point deviation $x_p$ and $y_p$, decentric lens distortion $P_1$ and $P_2$, radial lens distortion $K_1$, $K_2$ and $K_3$.

The lens distortion comes with each photo can be corrected on-the-fly by the camera 111 or the autopilot controller 112 to generate the calibrated-photo, which is then stored in the memory card 113, for further processing.

Figure 3:
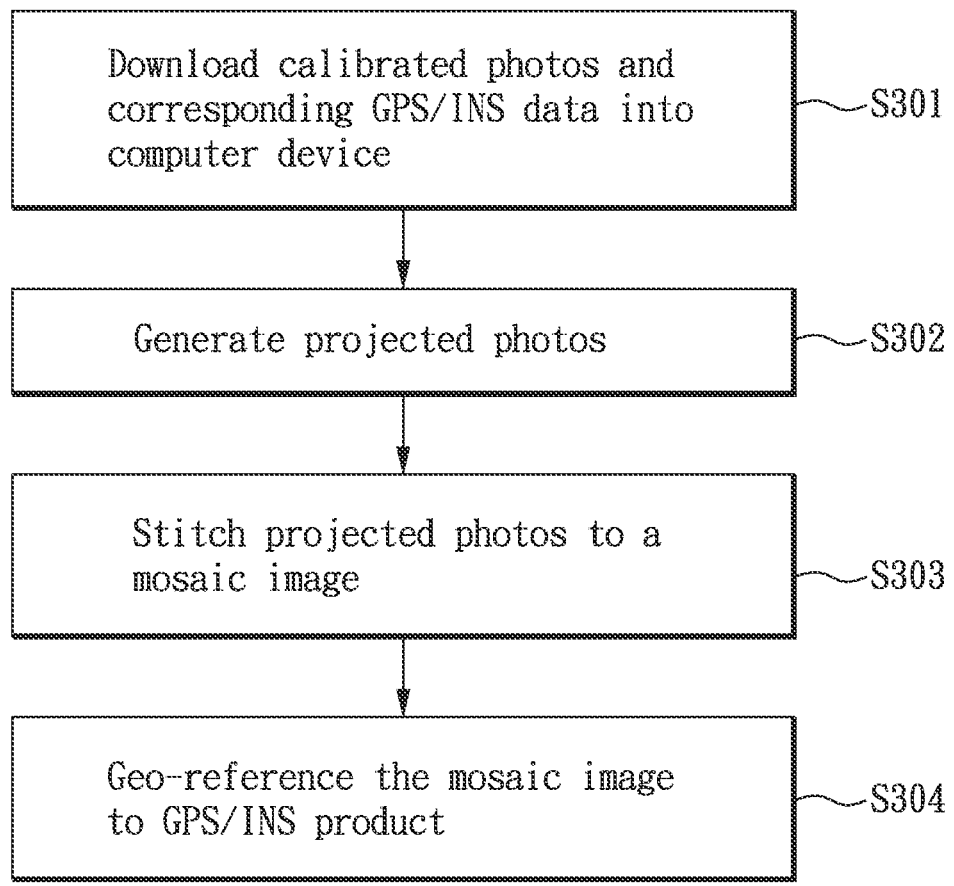
FIG. 3 shows the flowchart of an unmanned aerial vehicle image processing.

Based on the plural calibrated photos and the corresponding plural GPS/INS data, the computer device 12 performs an image processing to generate a mosaic image for the target polygon of the study area 15. FIG. 3 shows the flowchart of the image processing. In step S301, the plural calibrated photos and the corresponding plural GPS/INS data are downloaded into the computer device 12. Then, based on the principle of geometric projection, the plural calibrated photos are processed to generate plural projected photos by using the corresponding plural GPS/INS data, respectively (step S302). Specifically, each projected-photo can be generated by projecting four corners of the corresponding calibrated-photo to the ground coordinate, using the corresponding GPS/INS data recorded in the log file. In step S303, the plural projected photos are stitched to a mosaic image by a photo-stitching process. Since all projected-photos have been rotated to the north, they can be stitched to a seamless and color-balanced mosaic using a third-party photo-stitching software. By specifying the coordinates of three points referenced from the base image, the mosaic image can be geo-referenced to GPS/INS product (step S304).

Furthermore, according to the programmed flight mission, the base image can be cut into a set of reference images. Each reference image corresponds to one photo that would be taken by the unmanned aerial vehicle 11 during the flight mission.

Figure 4:
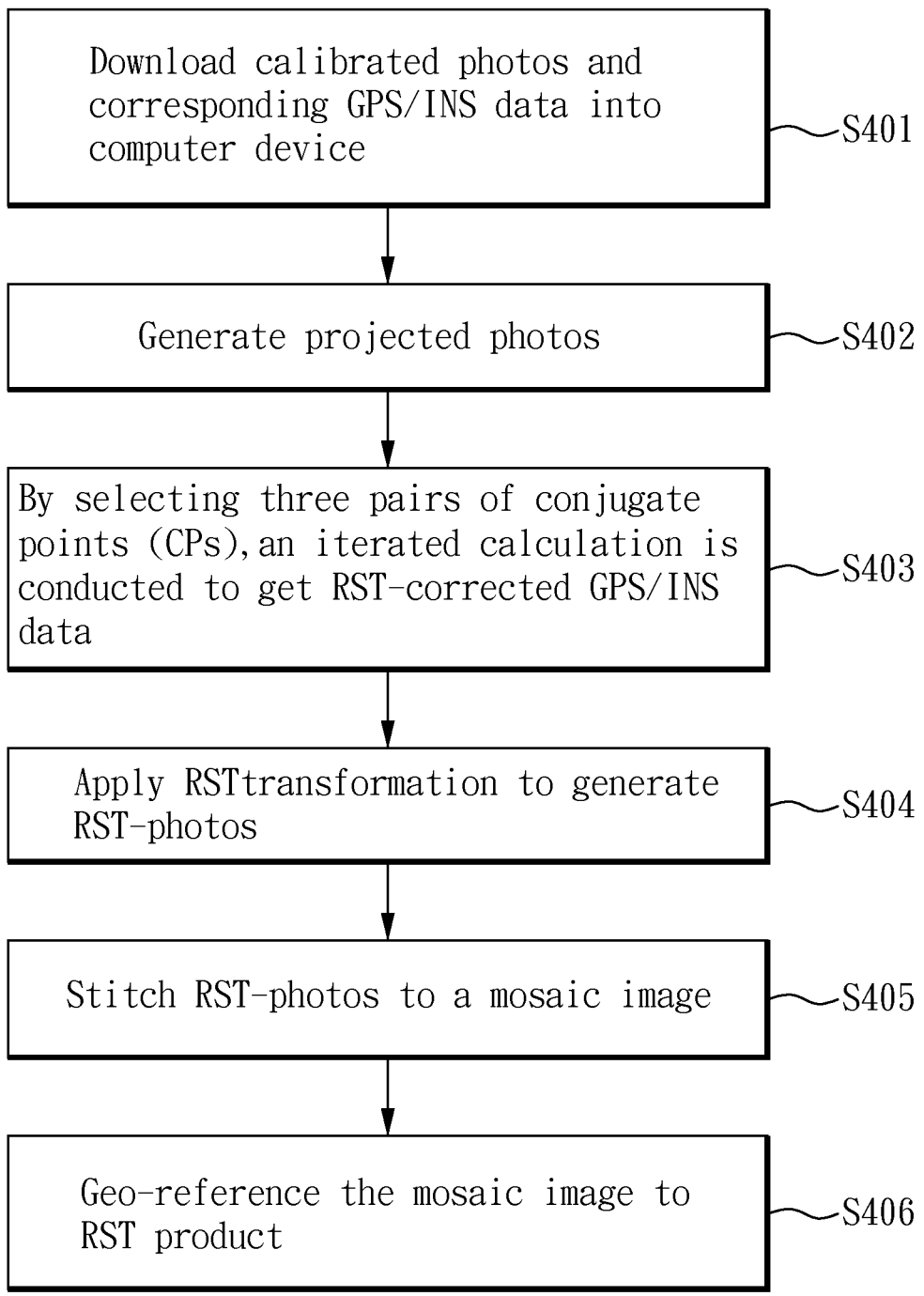
FIG. 4 shows the flowchart of another unmanned aerial vehicle image processing.

FIG. 4 shows the flowchart of another image processing. In step S401, the plural calibrated photos and the corresponding plural GPS/INS data are downloaded into the computer device 12. Then, based on the principle of geometric projection, the plural calibrated photos are processed to generate plural projected photos by using the corresponding plural GPS/INS data, respectively (step S402). Then, each projected-photo is compared to its corresponding reference image, and by selecting three pairs of conjugate points (CPs), an iterated calculation is conducted to get the rotation-scale-translation (RST)-corrected GPS/INS data that minimize the difference between the projected coordinates and the readings from the reference image (step S403). With the RST-corrected GPS/INS data, an RST transformation can be applied to geo-reference each calibrated-photo and generate the RST-photo (step S404). In step S405, since all RST-photos have been geo-referenced, they can be stitched to a seamless and color-balanced mosaic image using the third-party photo-stitching software. By specifying the coordinates of three points referenced from the base image, the mosaic image can be geo-referenced to RST product (Step S406).

Figure 5:
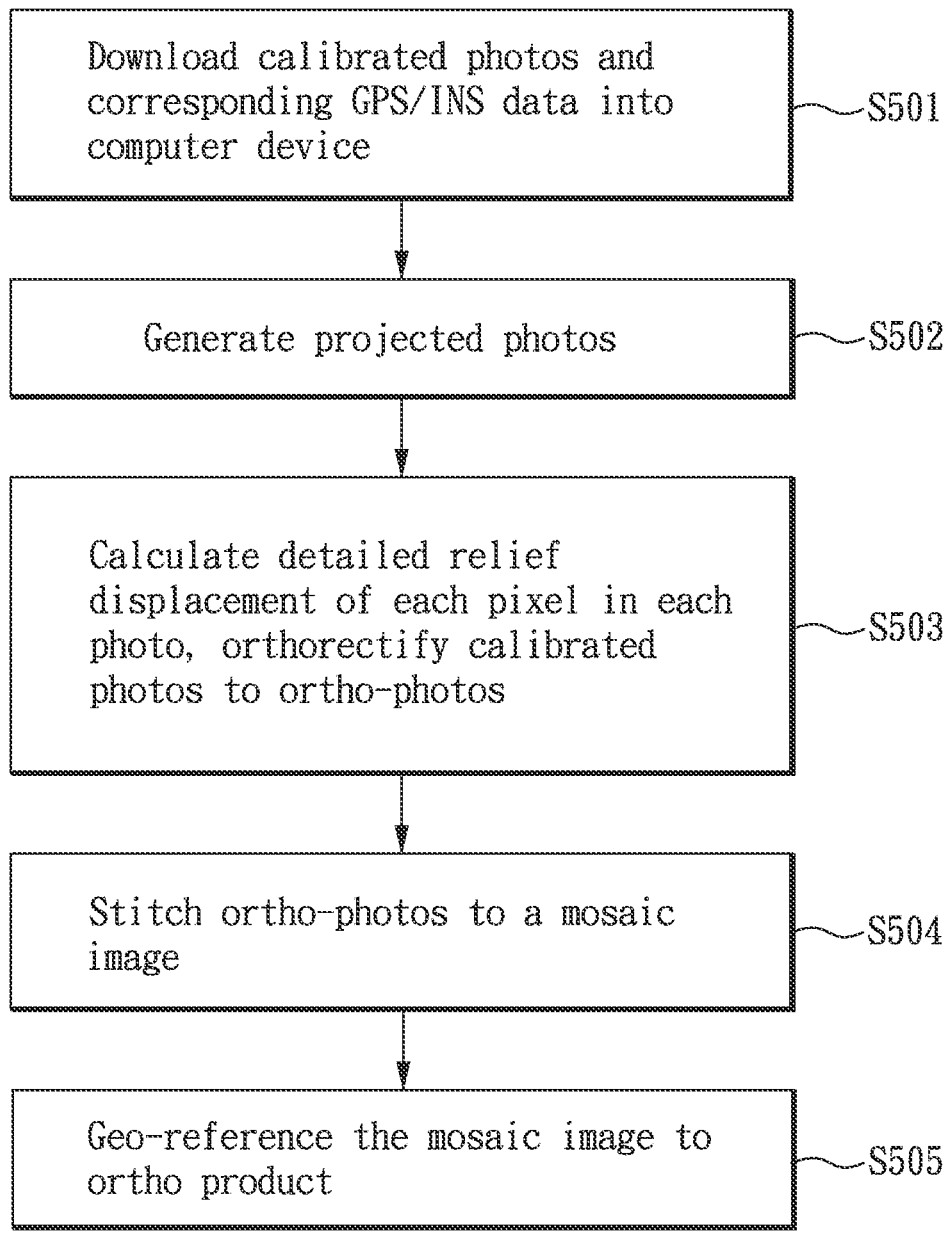
FIG. 5 shows the flowchart of a further unmanned aerial vehicle image processing.

In addition, if the DTM (Digital Terrain Model) of the study area 15 is provided, it can also be cut into a set of reference DTMs, each corresponding to one photo that would be taken by the unmanned aerial vehicle 11 during the flight mission. FIG. 5 shows the flowchart of a further image processing. In step S501, the plural calibrated photos and the corresponding plural GPS/INS data are downloaded into the computer device 12. Then, based on the principle of geometric projection, the plural calibrated photos are processed to generate plural projected photos by using the corresponding plural GPS/INS data, respectively (step S502). In step S503, with the reference DTM and three pairs of conjugate points, a detailed relief displacement of each pixel in each photo can be calculated. The calibrated-photo, therefore, can be orthorectified to the ortho-photo. In step S504, since all ortho-photos have been geo-referenced, they can be stitched to a seamless and color-balanced mosaic using the third-party photo-stitching software. By specifying the coordinates of three points referenced from the base image, the mosaic image can be geo-referenced to the ortho product (step S505).

Although the present invention has been explained in relation to its preferred embodiment, it is to be understood that many other possible modifications and variations can be made without departing from the spirit and scope of the invention as hereinafter claimed.

What is claimed is:

1. An unmanned aerial vehicle image processing system, comprising:
   a digital camera mounted on an unmanned aerial vehicle;
   an autopilot controller installed in the unmanned aerial vehicle and pre-loaded with a fly file generated from a base image drawn thereon a target polygon, wherein the autopilot controller is configured to program a flight path as a series of mission lags to cover the target polygon on the base image in a lawnmower pattern for controlling the unmanned aerial vehicle to perform a flight mission by traveling along the flight path in which the autopilot controller records plural Global Positioning System/Inertial Navigation System (GPS/INS) data and triggers the digital camera plural times to take plural photos which are further calibrated based on calibration parameters of lens distortion of the digital camera to calculate the amount of distortion for each pixel of plural photos, so as to generate plural calibrated photos corresponding to the plural GPS/INS data, respectively; and
   a computer device for receiving the plural calibrated photos and the plural GPS/INS data, processing the plural calibrated photos to generate plural projected photos by using the corresponding plural GPS/INS data, respectively, and stitching the plural projected photos to a mosaic image by a photo-stitching process,
   wherein the calibration parameters of lens distortion include principal point deviation, decentric lens distortion and radial lens distortion, and the amount of distortion for each pixel (x,y) of one photo is calculated based on the following equation:

$$\Delta x = -x_0 - \frac{\bar{x}}{c}\Delta c + \bar{x}r^2 K_1 + \bar{x}r^4 K_2 +$$
$$\bar{x}r^6 K_3 + (2\bar{x}^2 + r^2)P_1 + 2P_2\bar{x}\bar{y} + b_1 x + b_2 y,$$

$$\Delta y = -y_0 - \frac{\bar{y}}{c}\Delta c + \bar{y}r^2 K_1 + \bar{y}r^4 K_2 + \bar{y}r^6 K_3 + 2P_1\bar{x}\bar{y} + (2\bar{y}^2 + r^2)P_2,$$

where $\bar{x}=x-x_p$, $\bar{y}=y-y_p$, $r=\sqrt{\bar{x}^2+\bar{y}^2}$, c is the focal length, $x_p$ and $y_p$ are principal point deviation parameters, $P_1$ and $P_2$ are decentric lens distortion parameters, $K_1$, $K_2$ and $K_3$ are radial lens distortion parameters; and
   the plural photos maintain 50% of overlapping, the flight path is programmed to specify flight courses to be parallel with wind direction, and the flight path is programmed to add additional waypoints on the flight path to ensure that a full U-turn is made by the unmanned aerial vehicle.

2. The unmanned aerial vehicle image processing system as claimed in claim 1, wherein the computer device further geo-referencing the mosaic image by specifying coordinates of three points referenced from the base image.

3. The unmanned aerial vehicle image processing system as claimed in claim 1, wherein the base image is cut into plural reference images corresponding to the plural photos taken in the flight mission, respectively, and the computer device compares each projected photo to its corresponding reference image to generate an Rotation-Scale-Translation (RST)-corrected GPS/INS data, applies RST transformation to geo-reference the corresponding calibrated photo with the RST-corrected GPS/INS data, so as to generate an RST photo, and stitches all RST photos to a mosaic image by a photo-stitching process.

4. The unmanned aerial vehicle image processing system as claimed in claim 3, wherein each RST-corrected GPS/INS data is generated by selecting three pairs of conjugate points to conduct an iterated calculation.

5. The unmanned aerial vehicle image processing system as claimed in claim 1, wherein a Digital Terrain Model (DTM) for the base image is cut into plural reference DTMs corresponding to the plural photos taken in the flight mission, respectively, and the computer device determines detailed relief displacement for each pixel in each photo taken in the flight mission with a corresponding reference DTM and three pairs of conjugate points, orthorectifies each calibrated photo to an ortho photo based on the detailed relief displacements of the corresponding photo, and stitches all ortho photos to a mosaic image by a photo-stitching process.

6. An image processing method for use in an unmanned aerial vehicle image processing system including a digital camera mounted on an unmanned aerial vehicle, an autopilot controller installed in the unmanned aerial vehicle, and a computer device, the method comprising the steps of:

(A) configuring the autopilot controller, which is preloaded with a fly file generated from a base image drawn thereon a target polygon, to program a flight path as a series of mission lags to cover the target polygon on the base image in a lawnmower pattern for controlling the unmanned aerial vehicle to perform a flight mission by traveling along the flight path in which the autopilot controller records plural Global Positioning System/Inertial Navigation System (GPS/INS) data and triggers the digital camera plural times to take plural photos which are further calibrated based on calibration parameters of lens distortion of the digital camera to calculate the amount of distortion for each pixel of plural photos, so as to generate plural calibrated photos corresponding to the plural GPS/INS data, respectively;

(B) downloading the plural calibrated photos and the plural GPS/INS data into the computer device for processing the plural calibrated photos to generate plural projected photos by using the corresponding plural GPS/INS data, respectively; and (C) stitching the plural projected photos to a mosaic image by a photo-stitching process, wherein the calibration parameters of lens distortion include principal point deviation, decentric lens distortion and radial lens distortion, and the amount of distortion for each pixel (x,y) of one photo is calculated based on the following equation $$\Delta x = -x_0 - \frac{\bar{x}}{c}\Delta c + \bar{x}r^2 K_1 + \bar{x}r^4 K_2 +$$
$$\bar{x}r^6 K_3 + (2\bar{x}^2 + r^2)P_1 + 2P_2\bar{x}\bar{y} + b_1 x + b_2 y,$$

$$\Delta y = -y_0 - \frac{\bar{y}}{c}\Delta c + \bar{y}r^2 K_1 + \bar{y}r^4 K_2 + \bar{y}r^6 K_3 + 2P_1\bar{x}\bar{y} + (2\bar{y}^2 + r^2)P_2,$$

where $\bar{x}=x-x_p$, $\bar{y}=y-y_p$, $r=\sqrt{\bar{x}^2+\bar{y}^2}$, c is the focal length, $x_p$ and $y_p$ are principal point deviation parameters, $P_1$ and $P_2$ are decentric lens distortion parameters, $K_1$, $K_2$ and $K_3$ are radial lens distortion parameters; and the plural photos maintain 50% of overlapping, the flight path is programmed to specify flight courses to be parallel with wind direction, and the flight path is programmed to add additional waypoints on the flight path to ensure that a full U-turn is made by the unmanned aerial vehicle.

7. The image processing method as claimed in claim 6, further comprises:

geo-referencing the mosaic image by specifying coordinates of three points referenced from the base image.

8. The image processing method as claimed in claim 6, wherein the flight path is programmed to specify flight courses to be parallel wind direction.

9. The image processing method as claimed in claim 6, wherein the base image is cut into plural reference images corresponding to the plural photos taken in the flight mission, respectively, and the computer device compares each projected photo to its corresponding reference image to generate an Rotation-Scale-Translation (RST)-corrected GPS/INS data, applies RST transformation to geo-reference the corresponding calibrated photo with the RST-corrected GPS/INS data, so as to generate an RST photo, and stitches all RST photos to a mosaic image by a photo-stitching process.

10. The image processing method as claimed in claim 9, wherein each RST-corrected GPS/INS data is generated by selecting three pairs of conjugate points to conduct an iterated calculation.

11. The image processing method as claimed in claim 6, wherein a Digital Terrain Model (DTM) for the base image is cut into plural reference DTMs corresponding to the plural photos taken in the flight mission, respectively, and the computer device determines detailed relief displacement for each pixel in each photo taken in the flight mission with a corresponding reference DTM and three pairs of conjugate points, orthorectifies each calibrated photo to an ortho photo based on the detailed relief displacements of the corresponding photo, and stitches all ortho photos to a mosaic image by a photo-stitching process.

* * * * *